United States Patent
Tsunezawa et al.

(10) Patent No.: US 11,319,622 B2
(45) Date of Patent: May 3, 2022

(54) HIGH-STRENGTH STEEL SHEET AND HIGH-STRENGTH GALVANIZED STEEL SHEET

(71) Applicant: Kobe Steel, Ltd., Kobe (JP)

(72) Inventors: Michitaka Tsunezawa, Kakogawa (JP); Michiharu Nakaya, Kakogawa (JP); Haruka Araki, Kakogawa (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 17/041,290

(22) PCT Filed: Mar. 11, 2019

(86) PCT No.: PCT/JP2019/009685
§ 371 (c)(1),
(2) Date: Sep. 24, 2020

(87) PCT Pub. No.: WO2019/188190
PCT Pub. Date: Oct. 3, 2019

(65) Prior Publication Data
US 2021/0115542 A1    Apr. 22, 2021

(30) Foreign Application Priority Data

Mar. 26, 2018  (JP) .............................. JP2018-058189
Jan. 22, 2019  (JP) .............................. JP2019-008594

(51) Int. Cl.
C22C 38/38    (2006.01)
C22C 38/32    (2006.01)
(Continued)

(52) U.S. Cl.
CPC ............ *C22C 38/38* (2013.01); *B32B 15/013* (2013.01); *B32B 15/04* (2013.01); *B32B 15/043* (2013.01);
(Continued)

(58) Field of Classification Search
CPC ....... C22C 38/38; C22C 38/58; C22C 38/001; C22C 38/002; C22C 38/02; C22C 38/06;
(Continued)

(56) References Cited

U.S. PATENT DOCUMENTS

2011/0048589 A1  3/2011  Matsuda et al.
2015/0013856 A1  1/2015  Murakami et al.
2016/0017466 A1* 1/2016  Shibata .................. C21D 6/001
                                                        148/645

FOREIGN PATENT DOCUMENTS

JP     2013-185244 A    9/2013
WO  WO 2013/133164 A1   9/2013

OTHER PUBLICATIONS

International Search Report dated Jun. 4, 2019 in PCT/JP2019/009685 filed Mar. 11, 2019.
(Continued)

*Primary Examiner* — Michael E. La Villa
(74) *Attorney, Agent, or Firm* — Oblon, McClelland, Maier & Neustadt, L.L.P.

(57) ABSTRACT

A high-strength steel sheet satisfies a predetermined chemical composition in which a content of martensite is 93% by volume or more, contents of ferrite, pearlite, and bainite are 2% by volume or less in total, and a content of retained austenite is 7% by volume or less, based on an entire metal structure, a number of laths in martensite measured by a cutting method in a total length of 300 μm in an image of the metal structure observed under a scanning electron microscope is 240 or more, and a tensile strength of the high-strength steel sheet is 1470 MPa or more.

10 Claims, 6 Drawing Sheets

(51) Int. Cl.

| | |
|---|---|
| *C22C 38/28* | (2006.01) |
| *C22C 38/24* | (2006.01) |
| *C22C 38/22* | (2006.01) |
| *C22C 38/06* | (2006.01) |
| *C22C 38/02* | (2006.01) |
| *C22C 38/00* | (2006.01) |
| *B32B 15/01* | (2006.01) |
| *C21D 9/46* | (2006.01) |
| *C21D 8/02* | (2006.01) |
| *C21D 6/00* | (2006.01) |
| *C23C 2/06* | (2006.01) |
| *C23C 2/28* | (2006.01) |
| *C23C 2/40* | (2006.01) |
| *C22C 38/58* | (2006.01) |
| *C22C 38/08* | (2006.01) |
| *C22C 38/26* | (2006.01) |
| *C23C 30/00* | (2006.01) |
| *C22C 38/44* | (2006.01) |
| *C22C 38/50* | (2006.01) |
| *C22C 38/20* | (2006.01) |
| *C22C 38/46* | (2006.01) |
| *C22C 38/16* | (2006.01) |
| *C22C 38/40* | (2006.01) |
| *C22C 38/48* | (2006.01) |
| *B32B 15/04* | (2006.01) |
| *C22C 38/04* | (2006.01) |
| *C22C 38/18* | (2006.01) |
| *C22C 38/12* | (2006.01) |
| *C22C 38/42* | (2006.01) |
| *B32B 15/18* | (2006.01) |
| *C22C 38/14* | (2006.01) |
| *C22C 38/54* | (2006.01) |

(52) U.S. Cl.
CPC .............. *B32B 15/18* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/06* (2013.01); *C23C 2/28* (2013.01); *C23C 2/40* (2013.01); *C23C 30/00* (2013.01); *C23C 30/005* (2013.01); *C21D 2211/001* (2013.01); *C21D 2211/002* (2013.01); *C21D 2211/005* (2013.01); *C21D 2211/008* (2013.01); *C21D 2211/009* (2013.01); *Y10T 428/12799* (2015.01); *Y10T 428/12951* (2015.01); *Y10T 428/12972* (2015.01)

(58) Field of Classification Search
CPC ......... C22C 38/22; C22C 38/24; C22C 38/28; C22C 38/32; C22C 38/04; C22C 38/08; C22C 38/12; C22C 38/14; C22C 38/16; C22C 38/18; C22C 38/20; C22C 38/26; C22C 38/40; C22C 38/42; C22C 38/44; C22C 38/46; C22C 38/48; C22C 38/50; C22C 38/54; B32B 15/013; B32B 15/04; B32B 15/043; B32B 15/18; C21D 2211/001; C21D 2211/002; C21D 2211/005; C21D 2211/008; C21D 2211/009; C21D 6/002; C21D 6/008; C21D 8/0205; C21D 8/0226; C21D 8/0236; C21D 8/0263; C21D 9/46; C23C 2/06; C23C 2/28; C23C 2/40; C23C 30/00; C23C 30/005; Y10T 428/12799; Y10T 428/12951; Y10T 428/12972
See application file for complete search history.

(56) References Cited

OTHER PUBLICATIONS

Office Action dated Dec. 21, 2021 in corresponding Indian Patent Application No. 202047045629 (with English Translation), 6 pages.

* cited by examiner

HIGH-STRENGTH STEEL SHEET AND HIGH-STRENGTH GALVANIZED STEEL SHEET

TECHNICAL FIELD

The present invention relates to a high-strength steel sheet and a high-strength galvanized steel sheet having a galvanized layer on the surface of a high-strength steel sheet.

BACKGROUND ART

Steel sheets used as structural members of motor vehicles are required to have higher strength in order to improve fuel efficiency. When high-strength steel sheets are applied to structural members of motor vehicles, the high-strength steel sheets are required to have high impact absorption energy from the viewpoint of crashworthiness.

It is known that the impact absorption energy is higher as the tensile strength TS of the high-strength steel sheet is higher and the 0.2% proof $\sigma_{0.2}$ or upper yield point UYP of the high-strength steel sheet is higher. Hence, the steel sheets applied to the structural members of motor vehicles are required to have a tensile strength TS of 1470 MPa or more and a 0.2% proof stress or upper yield point UYP of 1000 MPa or more. Hereinafter, the tensile strength TS is abbreviated as "tensile strength" and the 0.2% proof stress or upper yield point UYP is abbreviated as "yield strength" in some cases.

Among the required properties described above, as a technology for improving the tensile strength of a high-strength steel sheet, for example, a technology as disclosed in Patent Literature 1 has been proposed. This Patent Literature 1 discloses that the tensile strength and formability can be improved by controlling the fraction of each of auto-tempered martensite, ferrite, bainite, and retained austenite and regulating the size and precipitated number of iron-based carbides in auto-tempered martensite.

However, in this technology, only the tensile strength and the formability are investigated but the yield strength is not taken into consideration. In this technology, the yield strength is measured after temper rolling of 0.3%. The yield strength can be increased by temper rolling, but a sufficient elongation may not be necessarily secured by temper rolling in the case of ultra high-strength steel sheet of 1470 MPa or more.

The present invention has been made in view of the above circumstances, and an object thereof is to provide a high-strength steel sheet having a yield strength of 1000 MPa or more at a high strength level of tensile strength of 1470 MPa or more and a high-strength galvanized steel sheet having a galvanized layer on the surface of such a high-strength steel sheet.

CITATION LIST

Patent Literature

Patent Literature 1: Japanese Patent No. 5365216

SUMMARY OF INVENTION

A high-strength steel sheet according to an aspect of the present invention comprises,
in % by mass,
C: 0.200% to 0.280%,
Si: 0.40% to 1.50% or less,
Mn: 2.00% to 3.00%,
P: more than 0% and 0.015% or less,
S: more than 0% and 0.0050% or less,
Al: 0.015% to 0.060%,
Cr: 0.20% to 0.80%,
Ti: 0.015% to 0.080%,
B: 0.0010% to 0.0040%, and
iron and inevitable impurities as remainder, wherein
a content of martensite is 93% by volume or more, contents of ferrite, pearlite, and bainite are 2% by volume or less in total, and a content of retained austenite is 7% by volume or less, based on an entire metal structure,
a number of laths in martensite measured by a cutting method in a total length of 300 μm in an image of the metal structure observed under a scanning electron microscope is 240 or more, and
a tensile strength of the high-strength steel sheet is 1470 MPa or more.

DESCRIPTION OF EMBODIMENTS

The present inventors have conducted extensive investigations focusing on the amounts of bainite, martensite, and retained austenite, and further, lath that is a substructure of bainite and martensite in order to provide a high-strength steel sheet having a tensile strength of 1470 MPa or more and a high yield strength.

As a result, it has been found out that the above object can be achieved when the chemical composition of the steel sheet, the volume fraction of martensite, the volume fraction of bainite and the like (including ferrite and pearlite), the volume fraction of retained austenite, and the number of laths in martensite measured by a cutting method in a total length of 300 μm in an image (hereinafter, referred to as "SEM image" in some cases) observed under a scanning electron microscope (SEM) are respectively regulated as to be described later, and the present inventors have further conducted studies based on the findings to complete the present invention. The term "high strength" is used below to mean that the "tensile strength is a strength level of 1470 MPa or more".

Lath is a substructure of martensite. The structure of martensite is multi-layered, there is a plurality of packets which are assemblies of grains having the same crystal habit plane in one former austenite grain, there is a block which is a parallel belt-shaped region inside each packet, and there is an assembly of laths which are martensite crystals having high-density dislocations in almost the same crystal orientation in each block.

The number of laths in martensite measured by a cutting method in a total length of 300 μm (hereinafter, referred to as "the number of laths per 300 µm of total length" in some cases) regulated in the present invention is the number measured by a cutting method in a total length of 300 µm after photographing a cross section that is parallel to the rolling direction in the ¼ portion thickness of the steel sheet which has been subjected to nital etching at 3000-fold using field emission scanning electron microscope (FE-SEM).

The present inventors have conducted extensive studies considering that lath in martensite affects the yield strength and tensile strength. As a result, it has been revealed that it is important to satisfy the later-described requirements on the number of laths per 300 µm of total length in order to achieve both high yield strength and tensile strength. Hereinafter, an embodiment of the present invention will be described in detail.

[Number of Laths Per 300 µm of Total Length: 240 or More]

In the high-strength steel sheet of the present embodiment, the number of laths per 300 µm of total length is required to be 240 or more. When the number of laths is less than 240, the yield strength or tensile strength decreases. The reason for this has not been necessarily made clear, but can be probably considered as follows. First, the boundaries between laths have an effect of hindering dislocation movement and increasing the yield strength as well as fine iron-based carbides such as cementite and film-like retained austenite are present at the boundaries of the laths in the chemical composition system of the present embodiment to be possibly a further hindrance to dislocation movement. From the above facts, it is considered that the yield strength and tensile strength increase as the number of laths per predetermined length increases. The lower limit of the number of laths is preferably 245 or more, more preferably 250 or more. The upper limit of the number of laths is generally 600 or less.

[Martensite: 93% by Volume or More]

Martensite in the metal structure is a matrix structure of the high-strength steel sheet of the present embodiment. By setting the content of martensite to 93% by volume or more with respect to the entire metal structure, the yield strength and tensile strength can be increased. When the content of martensite is less than 93% by volume, plastic deformation of other soft structures begins at a low stress and the yield strength decreases. The lower limit of martensite is preferably 94% by volume or more, more preferably 95% by volume or more. The upper limit of martensite is generally 99% by volume or less. Martensite includes tempered martensite and self-annealed martensite, but excessively tempered martensite is not included in the martensite targeted in the present embodiment since the number of laths per 300 µm of total length becomes less than 240 when tempering is excessively performed.

[Ferrite, Pearlite, and Bainite: 2% by Volume or Less in Total]

These structures are soft as compared to martensite that is the matrix structure, thus plastic deformation of these structures themselves begins at a low stress when these structures increase and the yield strength and tensile strength decrease. From such a viewpoint, it is required that the contents of ferrite, pearlite, and bainite are set to 2% by volume or less in total with respect to the entire metal structure. The upper limit of these structures is preferably 1.5% by volume or less, more preferably 1.0% by volume or less. The lower limit of bainite may be 0% by volume. In the following, ferrite, pearlite, and bainite are represented by "bainite" unless otherwise stated.

[Retained Austenite: 7% by Volume or Less]

It is required that the content of retained austenite in the metal structure is 7% by volume or less with respect to the entire metal structure. A small amount of film-like retained austenite present at the lath boundaries possibly has an effect of increasing the tensile strength and yield strength by suppressing dislocation movement. However, retained austenite itself is softer than the martensite structure, and thus both the yield strength and the tensile strength decrease when retained austenite is excessively present even though retained austenite is in the form of a film. From such a viewpoint, it is required that the content of retained austenite is set to 7% by volume or less. The upper limit of retained austenite is preferably 6% by volume or less, more preferably 5% by volume or less. The lower limit of retained austenite is generally 1% by volume or more.

In the high-strength steel sheet of the present embodiment, it is required that the chemical composition of the steel sheet is also properly regulated as well as the number of laths, martensite volume fraction, bainite volume fraction, and retained austenite volume fraction are regulated as described above. The reasons to set the ranges of these are as follows. In the following chemical composition, "%" means "% by mass".

(C: 0.200% to 0.280%)

C is an element that is required to secure the strength of the steel sheet. When the C content is insufficient, the tensile strength of the steel sheet decreases. Hence, the C content is set to 0.200% or more. The lower limit of the C content is preferably 0.205% or more, more preferably 0.210% or more. However, when C is excessively added, the volume fraction of retained austenite increases to more than 7% by volume and this may lead to a decrease in yield strength. Hence, the upper limit of the C content is set to 0.280% or less. The upper limit of the C content is preferably 0.270% or less, more preferably 0.260% or less. The upper limit is still more preferably 0.250% or less, yet still more preferably 0.240% or less.

(Si: 0.40% to 1.50%)

Si is known as a solid solution strengthening element and is an element that effectively acts to improve the tensile strength while suppressing deterioration in ductility. Si is also considered to be effective in suppression of excessive tempering of martensite and securement of fine lath. In order to effectively exert such effects, the Si content is required to be set to 0.40% or more. The lower limit of the Si content is preferably 0.50% or more, more preferably 0.60% or more. The lower limit is still more preferably 0.70% or more, yet still more preferably 0.80% or more. However, when Si content is excessive, the volume fraction of retained austenite increases and this may lead to a decrease in yield strength. Hence, the upper limit of the Si content is set to 1.50% or less. The upper limit of the Si content is preferably 1.40% or less, more preferably 1.30% or less.

(Mn: 2.00% to 3.00%)

Mn is an element that contributes to an increase in strength of the steel sheet, and is required in order to suppress the generation of ferrite and bainite and to attain the intended structure mainly composed of martensite. In order to effectively exert such effects, the Mn content is required to be set to 2.00% or more. The lower limit of the Mn content is preferably 2.05% or more, more preferably 2.10% or more. However, when the Mn content is excessive, slab breakage, an increase in cold rolling load, and the like may be caused. Hence, the upper limit of the Mn content is set to 3.00% or less. The upper limit of the Mn content is preferably 2.90% or less, more preferably 2.80% or less. The upper limit is still more preferably 2.70% or less, yet still more preferably 2.60% or less.

(P: More than 0% and 0.015% or Less)

P is an element that is inevitably contained, is an element that segregates at the grain boundaries and promotes grain boundary embrittlement, and is recommended to be decreased as much as possible in order to avoid breakage and the like during processing. Hence, the P content is set to 0.015% or less. The upper limit of the P content is preferably 0.013% or less, more preferably 0.010% or less. P is an impurity that is inevitably mixed into steel, and it is impossible to decrease the P content to 0% in industrial production.

(S: More than 0% and 0.0050% or Less)

S is an element that is inevitably contained like P, and generates inclusions, and the S content is recommended to be decreased as much as possible in order to avoid breakage and the like during processing. Hence, the S content is set to 0.0050% or less. The upper limit of the S content is preferably 0.0040% or less, more preferably 0.0030% or less. S is an impurity that is inevitably mixed into steel, and it is impossible to decrease the S content to 0% in industrial production.

(Al: 0.015% to 0.060%)

Al is an element that acts as a deoxidizer. In order to effectively exert such effects, the Al content is required to be set to 0.015% or more. The lower limit of the Al content is preferably 0.025% or more, more preferably 0.030% or more. However, when the Al content is excessive, a large amount of inclusions such as alumina is generated in the steel sheet, which may lead to breakage during processing. Hence, the upper limit of the Al content is set to 0.060% or less. The upper limit of the Al content is preferably 0.055% or less, more preferably 0.050% or less.

(Cr: 0.20% to 0.80%)

Cr is required to suppress the generation of ferrite and bainite and to attain the intended structure mainly composed of martensite. Cr is also considered to have an effect of suppressing excessive tempering of martensite and refining the lath. In order to effectively exert such effects, the Cr content is required to be set to 0.20% or more. The lower limit of the Cr content is preferably 0.25% or more, more preferably 0.30% or more. However, when the Cr content is excessive, bare spot may occur when the surface of the steel sheet is subjected to hot-dip galvanizing or galvannealing. Hence, the upper limit of the Cr content is set to 0.80% or less. The upper limit of the Cr amount is preferably 0.75% or less, more preferably 0.70% or less.

(Ti: 0.015% to 0.080%)

Ti is an element that forms a carbide and a nitride to improve the strength of the steel sheet. Ti is also an effective element to effectively exert the hardenability improving effect by B to be described later. In other words, Ti decreases N in steel by forming a nitride, as a result, the formation of B nitrides is suppressed, B is in a solid solution state, and the hardenability improving effect by B can be effectively exerted. Ti contributes to an increase in strength of the steel sheet by improving the hardenability in this manner. In order to effectively exert such effects, the Ti content is required to be set to 0.015% or more. The lower limit of the Ti content is preferably 0.018% or more, more preferably 0.020% or more.

However, when the Ti content is excessive, Ti carbide and Ti nitride are excessive, which may cause cracking during processing. Hence, the upper limit of the Ti content is set to 0.080% or less. The upper limit of the Ti content is preferably 0.070% or less, more preferably 0.060% or less, still more preferably 0.050% or less. The upper limit is yet still more preferably 0.040% or less.

(B: 0.0010% to 0.0040%)

B has an effect of improving hardenability and suppressing the generation of ferrite and bainite. B is an element that contributes to an increase in strength of the steel sheet by this action. In order to effectively exert such effects, the B content is required to be set to 0.0010% or more. The lower limit of the B content is preferably 0.0012% or more, more preferably 0.0014% or more. However, when the B content is excessive, the effect is saturated and the cost only increases, and thus the B content is set to 0.0040% or less. The upper limit of the B content is preferably 0.0030% or less.

The basic components of the high-strength steel sheet of the present embodiment are as described above, and the remainder is substantially iron. However, it is naturally permissible for steel to contain impurities that are inevitably introduced depending on the situation of raw materials, materials, manufacturing facilities, and the like. Such inevitable impurities include, for example, N and O in addition to P and S described above, and it is preferable that these are in the following ranges, respectively.

(N: 0.0100% or Less)

N is inevitably present as an impurity element and may cause cracking during processing. For this reason, the N content is preferably 0.0100% or less, more preferably 0.0060% or less, still more preferably 0.0050% or less. It is more preferable as the N content is lower, but it is difficult to set the N content to 0% in industrial production.

(C: 0.0020% or Less)

O is inevitably present as an impurity element and may cause cracking during processing. For this reason, the O content is preferably 0.0020% or less, more preferably 0.0015% or less, still more preferably 0.0010% or less. It is more preferable as the O content is lower, but it is difficult to set the O content to 0% in industrial production.

The high-strength steel sheet of the present embodiment may contain elements such as Cu, Ni, Cr, Mo, V, Nb, and Ca in the ranges to be presented below if necessary, and the properties of the steel sheet are further improved depending on the kinds of elements contained. These elements can be contained singly or in appropriate combination in the ranges to be presented below.

(Cu: More than 0% and 0.30% or Less)

Cu is an element effective in improvement of corrosion resistance of the steel sheet and may be contained if necessary. The effect of Cu increases as the Cu content increases, and the Cu content is preferably 0.03% or more, more preferably 0.05% or more in order to effectively exert the effect. However, when the Cu content is excessive, the effect is saturated and the cost increases. For this reason, the upper limit of the Cu content is preferably 0.30% or less, more preferably 0.20% or less, still more preferably 0.15% or less.

(Ni: More than 0% and 0.30% or Less)

Ni is an element effective in improvement of corrosion resistance of the steel sheet and may be contained if necessary. The effect of Ni increases as the Ni content increases, and the Ni content is preferably 0.03% or more, more preferably 0.05% or more in order to effectively exert the effect. However, when the Ni content is excessive, the effect is saturated and the cost increases. For this reason, the upper limit of the Ni content is preferably 0.30% or less, more preferably 0.20% or less, still more preferably 0.15% or less.

(Mo: More than 0% and 0.30% or Less)

Mo is an element that contributes to an increase in strength of the steel sheet and may be contained if necessary.

The effect of Mo increases as the Mo content increases, and the Mo content is preferably 0.03% or more, more preferably 0.05% or more in order to effectively exert the effect. However, when the Mo content is excessive, the effect is saturated and the cost increases. For this reason, the upper limit of the Mo content is preferably 0.30% or less, more preferably 0.25% or less, still more preferably 0.20% or less.

(V: More than 0% and 0.30% or Less)

V is an element that contributes to an increase in strength of the steel sheet and may be contained if necessary. The effect of V increases as the V content increases, and the V content is preferably 0.05% or more, more preferably 0.010% or more in order to effectively exert the effect. However, when the V content is excessive, the effect is saturated and the cost increases. For this reason, the upper limit of the V content is preferably 0.30% or less, more preferably 0.25% or less, still more preferably 0.20% or less, yet still more preferably 0.15% or less.

(Nb: More than 0% and 0.040% or Less)

Nb is an element that contributes to an increase in strength of the steel sheet and may be contained if necessary. The effect of Nb increases as the Nb content increases, and the Nb content is preferably 0.003% or more, more preferably 0.005% or more in order to effectively exert the effect. However, when the Nb content is excessive, the bendability deteriorates. For this reason, the upper limit of the Nb content is preferably 0.040% or less, more preferably 0.035% or less, still more preferably 0.030% or less.

(Ca: More than 0% and 0.0050% or Less)

Ca is an element effective to form the sulfide in the steel into a spherical shape and enhance the bendability and may be contained if necessary. The effect of Ca increases as the Ca content increases, and the Ca content is preferably 0.0005% or more, more preferably 0.0010% or more in order to effectively exert the effect. However, when the Ca content is excessive, the effect is saturated and the cost increases. For this reason, the upper limit of the Ca content is preferably 0.0050% or less, more preferably 0.0030% or less, still more preferably 0.0025% or less.

Next, a method for manufacturing the high-strength steel sheet of the present embodiment will be described.

The high-strength steel sheet of the present embodiment, which satisfies the requirements, can be manufactured by properly controlling particularly the annealing process after cold rolling in the respective processes of hot rolling, cold rolling, and annealing (heating, soaking, and cooling). Hereinafter, the conditions for manufacturing the high-strength steel sheet of the present embodiment will be described in the order of hot rolling, cold rolling, and subsequent annealing.

The conditions of hot rolling are, for example, as follows.

[Hot Rolling Conditions]

When the heating temperature before hot rolling is low, carbides such as TiC may hardly form a solid solution in austenite. Hence, the heating temperature before hot rolling is preferably set to 1200° C. or more. This heating temperature is more preferably 1250° C. or more. However, when the heating temperature before hot rolling is too high, the cost increases. For this reason, the upper limit of the heating temperature before hot rolling is preferably 1350° C. or less, more preferably 1300° C. or less.

When the finish rolling temperature of the hot rolling is low, the deformation resistance during rolling may increase and this may make the operation difficult. Hence, the finish rolling temperature is preferably set to 850° C. or more. This finish rolling temperature is more preferably 870° C. or more. However, when the finish rolling temperature is too high, scratches due to scale may be generated. For this reason, the upper limit of the finish rolling temperature is preferably 980° C. or less, more preferably 950° C. or less.

The average cooling rate from finish rolling to coiling of hot rolling is preferably 10° C./sec or more, more preferably 20° C./sec or more in consideration of productivity. On the other hand, when the average cooling rate is too fast, hardening may occur and it may be difficult to perform subsequent cold rolling. For this reason, the average cooling rate is preferably 100° C./sec or less, more preferably 50° C./sec or less.

[Hot Rolling Coiling Temperature: 620° C. or More]

When the hot rolling coiling temperature is less than 620° C., the strength of the hot-rolled steel sheet may increase and it may be difficult to reduce the pressure during cold rolling. For this reason, the coiling temperature during hot rolling is preferably 620° C. or more, more preferably 630° C. or more, still more preferably 640° C. or more. On the other hand, when the coiling temperature during hot rolling is too high, the scale becomes thick and the pickling property deteriorates. For this reason, the coiling temperature is preferably 750° C. or less, more preferably 700° C. or less.

[Rolling Rate During Cold Rolling: 10% or More and 70% or Less]

The hot-rolled steel sheet is subjected to pickling for scale removal and then cold-rolled. When the rolling rate (synonymous with "rolling reduction") during cold rolling is less than 10%, it is difficult to secure predetermined thickness tolerance. The sheet thickness is required to be thinned in the hot rolling process in order to obtain a steel sheet with a predetermined thickness, the length of the steel sheet is lengthened when the sheet thickness is thinned in the hot rolling process, thus it takes time for pickling and productivity decreases. For this reason, the rolling rate during cold rolling is preferably set to 10% or more. The rolling rate is more preferably 20% or more, still more preferably 25% or more. On the other hand, when the rolling rate during cold rolling exceeds 70%, cracking during cold rolling more possibly occurs. For this reason, the upper limit of the rolling rate during cold rolling is preferably 70% or less. The upper limit is more preferably 65% or less, still more preferably 60% or less.

In order to obtain the high-strength steel sheet of the present embodiment, it is recommended to properly control the annealing process after cold rolling. This annealing process basically includes the following (a) soaking step at 900° C. or more after heating, (b) a first cooling step from 900° C. to 540° C. to be performed subsequent to step (a), (c) a second cooling step from 540° C. to 440° C. to be performed subsequent to step (b), (d) a third cooling step from 440° C. to 280 to 230° C., and (e) a fourth cooling step from 230° C. to 50° C. or less. The high-strength steel sheet of the present embodiment can be obtained by the manufacturing method including such steps.

The high-strength steel sheet of the present embodiment includes those having a hot-dip galvanized steel sheet and a hot-dip galvannealed steel sheet on the surface, but when these galvanized steel sheets are manufactured, the immersion treatment in molten zinc and the subsequent heat treatment for alloying of zinc with iron may be performed together in (c) the second cooling step from 540° C. to 440° C.

The heat pattern of the annealing process including steps (a) to (e) described above will be specifically described below with reference to the schematic diagram of FIG. 1.

(a) Soaking Step at 900° C. or More after Heating

The materials are heated to 900° C. or more and held at 900° C. or more for 20 seconds or more. When the soaking temperature is less than 900° C., soft ferrite that decreases the yield strength and tensile strength is possibly generated. For this reason, the lower limit of the temperature is set to 900° C. or more. The lower limit is preferably 905° C. or more, more preferably 910° C. or more. The upper limit of the soaking temperature is not particularly set, but is preferably 1000° C. or less since the productivity becomes poor. The upper limit is more preferably 980° C. or less, still more preferably 960° C. or less.

When the holding time at 900° C. or more is less than 10 seconds even though the soaking temperature is 900° C. or more, ferrite is possibly generated. For this reason, the holding time at 900° C. or more is set to 10 seconds or more. The holding time is preferably 15 seconds or more, more preferably 20 seconds or more. The upper limit of the holding time is not particularly set, but is preferably 200 seconds or less, more preferably 100 seconds or less since the productivity becomes poor.

(b) First Cooling Step from 900° C. to 540° C.

The average cooling rate in the first cooling step from 900° C. to 540° C. is set to 10° C./sec or more and 50° C./sec or less. When this average cooling rate is less than 10° C./sec, ferrite is more possibly generated and it is difficult to secure the desired yield strength and tensile strength. For this reason, the average cooling rate is required to be set to 10° C./sec or more and is preferably 11° C./sec or more, more preferably 12° C./sec or more. On the other hand, when the average cooling rate exceeds 50° C./sec, it is difficult to control the steel sheet temperature and the facility cost increases. For this reason, the upper limit of the average cooling rate is required to be set to 50° C./sec or less and is preferably 40° C./sec or less, more preferably 30° C./sec or less.

(c) Second Cooling Step from 540° C. to 440° C.

The average cooling rate to the cooling stop temperature in the second cooling step of 540° C. or less is required to be set to 0.5° C./sec or less. When the average cooling rate in the second cooling step is less than 0.5° C./sec, bainite may increase. For this reason, the average cooling rate is set to 0.5° C./sec or more. The average cooling rate is preferably 0.8° C./sec or more. The upper limit of the average cooling rate is not particularly set, but is preferably 50° C./sec or less since it is required to remarkably enhance the capacity of facility. The upper limit is more preferably 40° C./sec or less, still more preferably 30° C./sec or less.

The cooling stop temperature in the second cooling step is required to be set to 440° C. or more. When the cooling stop temperature in the second cooling step is less than 440° C., the yield strength and tensile strength decrease since bainite content increases. For this reason, the lower limit of the cooling stop temperature in the second cooling step is set to 440° C. or more. The lower limit is preferably 445° C. or more, more preferably 450° C. or more.

Figure 1:
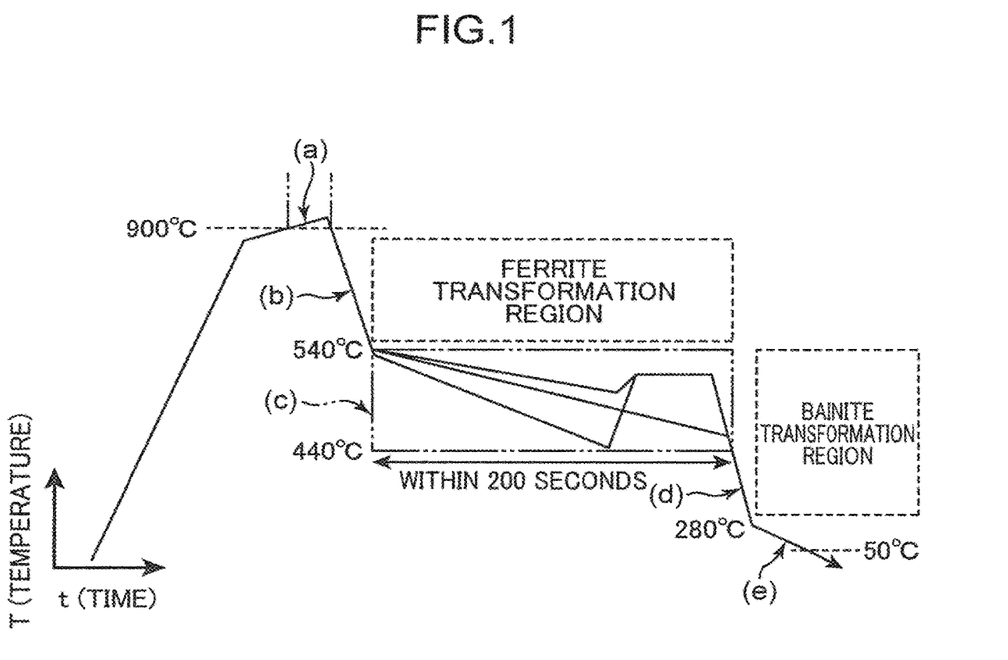
FIG. 1 is a schematic diagram illustrating a heat pattern in an annealing process.

In FIG. 1 above, three kinds of cooling patterns in the first cooling step are illustrated, but this indicates that any cooling pattern may be adopted as long as the average cooling rate described above can be secured. In other words, the average cooling rate of 0.5° C./sec or more can be secured when the temperature range from 540° C. to 440° C. passes within 200 seconds.

When performing hot-dip galvanizing, the average cooling rate including the immersion treatment in the plating bath and the heat treatment for alloying in the second cooling step are required to satisfy the conditions described above. The temperature of the steel sheet before immersion in the plating bath is preferably in a range of more than 440° C. to 480° C. or less.

After the immersion treatment in molten zinc, a heat treatment for alloying of zinc with iron is performed if necessary. In this heat treatment for alloying, the temperature (heat treatment temperature for alloying) is required to be set to 440° C. or more and 540° C. or less in order to secure the plating performance. When this temperature is less than 440° C., galvanizing and diffusion of iron are insufficient and a hot-dip galvannealed layer cannot be formed. For this reason, the lower limit of the heat treatment temperature for alloying is set to 440° C. or more. The lower limit is preferably 445° C. or more, more preferably 450° C. or more. On the other hand, when the heat treatment temperature for alloying exceeds 540° C., ferrite is more possibly generated, the tensile strength decreases as well as the diffusion of iron into zinc is excessive, a hot-dip galvannealed layer is brittle and easily peels off, and the plating more possibly peels off during press molding and the like.

(d) Third Cooling Step from 440° C. to 280-230° C.

The average cooling rate to the cooling stop temperature in the third cooling step is required to be set to 5.0° C./sec or less. When the average cooling rate in the third cooling step is less than 5.0° C./sec, bainite may increase. Even when the generation of bainite is suppressed, bainite is stabilized as the distribution of carbon from martensite generated after passing of the Ms point to retained austenite proceeds, and the amount of bainite to be transformed into martensite decreases. As a result, the content of retained austenite is likely to exceed 7%, and thus the average cooling rate is set to 5.0° C./sec or more.

The Ms point is the temperature at which martensite begins to be transformed and can be easily determined from the chemical composition of the steel sheet based on the following Equation (I) described in "Tekko Zairyo" (published by The Japan Institute of Metals, p. 45). [ ] in the following Equation (I) denotes the content (% by mass) of each element, and the element that is not contained in the steel sheet is regarded as 0% for calculation.

$$Ms\ point(°C.)=550-361[C]-39[Mn]-35[V]-20[Cr]-17[Ni]-10[Cu]-5([Mo]+[W])+15[Co]+30[Al] \quad (I)$$

The average cooling rate is preferably 15.0° C./sec or more, more preferably 20° C./sec or more. The upper limit of the average cooling rate at this time is not particularly set, but is preferably 50° C./sec or less since it is required to remarkably increase the facility capacity in order to excessively increase the average cooling rate. The upper limit is more preferably 40° C./sec or less, still more preferably 30° C./sec or less.

The cooling stop temperature in the third cooling step is required to be set to 230° C. or more and 280° C. or less. When the cooling stop temperature in the third cooling step is less than 230° C., the self-tempering of martensite is excessive, the number of laths in martensite possibly decreases, and the tensile strength possibly decreases. For this reason, the lower limit of the cooling stop temperature in the third cooling step is set to 230° C. or more. The lower limit is preferably 240° C. or more, more preferably 250° C. or more.

On the other hand, when the cooling stop temperature in the third cooling step exceeds 280° C., bainite content possibly increase and the yield strength and tensile strength possibly decrease. For this reason, the upper limit of the cooling stop temperature in the third cooling step is set to 280° C. or less. The upper limit is preferably 275° C. or less, more preferably 270° C. or less.

(e) Fourth Cooling Step from 230° C. to 50° C.

In the fourth cooling step that is subsequently performed after the third cooling step, the average cooling rate from 230° C. to 50° C. or less that is the cooling stop temperature is preferably 3.0° C./sec or less. When the cooling stop temperature in the third cooling step is higher than 230° C., the average cooling rate from the cooling stop temperature in the third cooling step to 230° C. does not matter.

It is considered that the presence of a proper amount of film-like austenite at the lath boundaries is preferable for enhancing the effect as a barrier to dislocation movement and securing the yield strength and tensile strength. When the average cooling rate in the fourth cooling step is faster than 3.0° C./sec, retained austenite becomes less than 1% by volume and it is difficult to exert the effect as a barrier to dislocation movement. For this reason, the average cooling rate is set to 3.0° C./sec or less. The average cooling rate is preferably 2.5° C./sec or less, more preferably 2.0° C./sec or less. The lower limit of the average cooling rate at this time is not particularly set but is preferably 0.05° C./sec or more since the productivity becomes poor. The lower limit is more preferably 0.10° C./sec or more.

The high-strength steel sheet of the present embodiment is not limited to one obtained by the manufacturing method described above. The high-strength steel sheet of the present embodiment may be obtained by another manufacturing method as long as it satisfies the constituent requirements regulated in the present invention.

The high-strength steel sheet of the present embodiment is a high-strength steel sheet in which the chemical composition is adjusted as described above, the content of martensite is set to 93% by volume or more, the content of bainite is set to 2% by volume or less, and the content of retained austenite is set to 7% by volume or less based on the entire metal structure, the number of laths measured by a cutting method in a total length of 300 μm in the SEM image of the metal structure is 240 or more, and the tensile strength of the high-strength steel sheet is 1470 MPa or more. Such a high-strength steel sheet has a tensile strength of 1470 MPa or more and a yield strength of 1000 MPa or more.

The tensile strength of the high-strength steel sheet of the present embodiment is preferably 1500 MPa or more, more preferably 1550 MPa or more. It is more preferable as the tensile strength is higher, and the upper limit of the tensile strength is not particularly limited but is usually about 1800 MPa. The yield strength is preferably 1020 MPa or more, more preferably 1040 MPa or more. It is more preferable as the yield strength is higher, and the upper limit of the yield strength is not particularly limited but is usually about 1400 MPa.

The high-strength steel sheet of the present embodiment has sufficiently high yield strength and tensile strength without being subjected to temper rolling, but it is also possible to achieve a still higher yield strength by performing temper rolling.

The surface of the high-strength steel sheet of the present embodiment may be provided with a hot-dip galvanized layer (GI) or a hot-dip galvannealed layer (GA). In other words, a high-strength galvanized steel sheet and a high strength galvannealed steel sheet having a hot-dip galvanized layer or a hot-dip galvannealed layer on the surface of a high-strength steel sheet are also included in the present invention. The kind of the galvanized layer at this time is not particularly limited, and the galvanized layer may contain an alloy element. The galvanized layer is covered on one side or both sides of the steel sheet.

The present specification discloses various aspects of a technology as described above, but the main technology is summarized below.

A high-strength steel sheet according to an aspect of the present invention comprises, in % by mass, C: 0.200% to 0.280%,
Si: 0.40% to 1.50% or less,
Mn: 2.00% to 3.00%,
P: more than 0% and 0.015% or less,
S: more than 0% and 0.0050% or less,
Al: 0.015% to 0.060%,
Cr: 0.20% to 0.80%,
Ti: 0.015% to 0.080%,
B: 0.0010% to 0.0040%, and
iron and inevitable impurities as remainder, wherein A content of martensite is 93% by volume or more, contents of ferrite, pearlite, and bainite are 2% by volume or less in total, and a content of retained austenite is 7% by volume or less, based on an entire metal structure, a number of laths in martensite measured by a cutting method in a total length of 300 μm in an image of the metal structure observed under a scanning electron microscope is 240 or more, and a tensile strength of the high-strength steel sheet is 1470 MPa or more.

By the configuration, it is possible to realize a high strength steel sheet having a yield strength of 1000 MPa or more at a high strength level of tensile strength of 1470 MPa or more.

It is also useful that the high-strength steel sheet further comprises, in % by mass, one or more selected from the group consisting of Cu: more than 0% and 0.30% or less, Ni: more than 0% and 0.30% or less, Mo: more than 0% and 0.30% or less, V: more than 0% and 0.30% or less, Nb: more than 0% and 0.040% or less, and Ca: more than 0% and 0.0050% or less if necessary, and the properties of the high-strength cold-rolled steel sheet are further improved depending on the kinds of elements contained.

A high-strength galvanized steel sheet according to another aspect of the present invention has a hot-dip galvanized layer or a hot-dip galvannealed layer on a surface of a high-strength steel sheet as described above.

Hereinafter, the present invention will be described more specifically with reference to Examples, but the present invention is not limited to the following Examples, it is also possible to carry out the present invention by adding changes within a range that is compatible with the above-mentioned gist and the below-mentioned gist, and all of them are included in the technical scope of the present invention.

EXAMPLES

Slabs for experiment having the chemical compositions (steel types: steels A, B, and C) presented in the following Table 1 were manufactured. The slab was heated to 1250° C. and hot-rolled to a sheet thickness of 2.8 mm to 3.1 mm. At this time, the finish rolling temperature was set to 900° C., the average cooling rate from finish rolling to coiling of the hot rolling was set to 20° C./see, and the coiling temperature was set to 650° C., and hot rolling was performed. The obtained hot-rolled steel sheet was pickled and then subjected to surface grinding or cold rolling to decrease the thickness to 1.4 mm to 2.6 mm. At this time, the cold rolling rates (rolling rates during cold rolling) of the steel types were all in a range of 10% to 60%. In Table 1, the column "-" means no addition and the column "<" means less than the measurement limit. P, S, N, and O are inevitable impurities as described above, and the values presented in the columns of P, S, N, and O mean amounts inevitably contained. The remainder contains iron and inevitable impurities other than the above-mentioned inevitable impurities.

TABLE 1

| Steel type | Chemical composition (% by mass) | | | | | | | | | | | | | | | | | Ms point (° C.) |
|---|---|---|---|---|---|---|---|---|---|---|---|---|---|---|---|---|---|---|
| | C | Si | Mn | P | S | Al | Ti | B | Cu | Ni | Cr | Mo | V | Nb | Ca | N | O | |
| A | 0.224 | 1.17 | 2.22 | 0.008 | 0.0012 | 0.044 | 0.026 | 0.0016 | — | — | — | — | — | — | — | 0.0038 | 0.0006 | 383.9 |
| B | 0.226 | 1.18 | 2.22 | 0.009 | 0.0018 | 0.044 | 0.026 | 0.0016 | — | — | 0.60 | — | — | — | — | 0.0033 | 0.0006 | 371.2 |
| C | 0.230 | 0.50 | 2.20 | <0.003 | <0.001 | 0.038 | 0.025 | 0.0022 | — | — | 0.25 | 0.200 | <0.002 | — | — | 0.0008 | — | 376.3 |

Ms point (° C.) = 550 − 361[C] − 39[Mn] − 35[V] − 20[Cr] − 17[Ni] − 10[Cu] − 5([Mo] + [W]) + 15[Co] + 30[Al]

Figure 3:
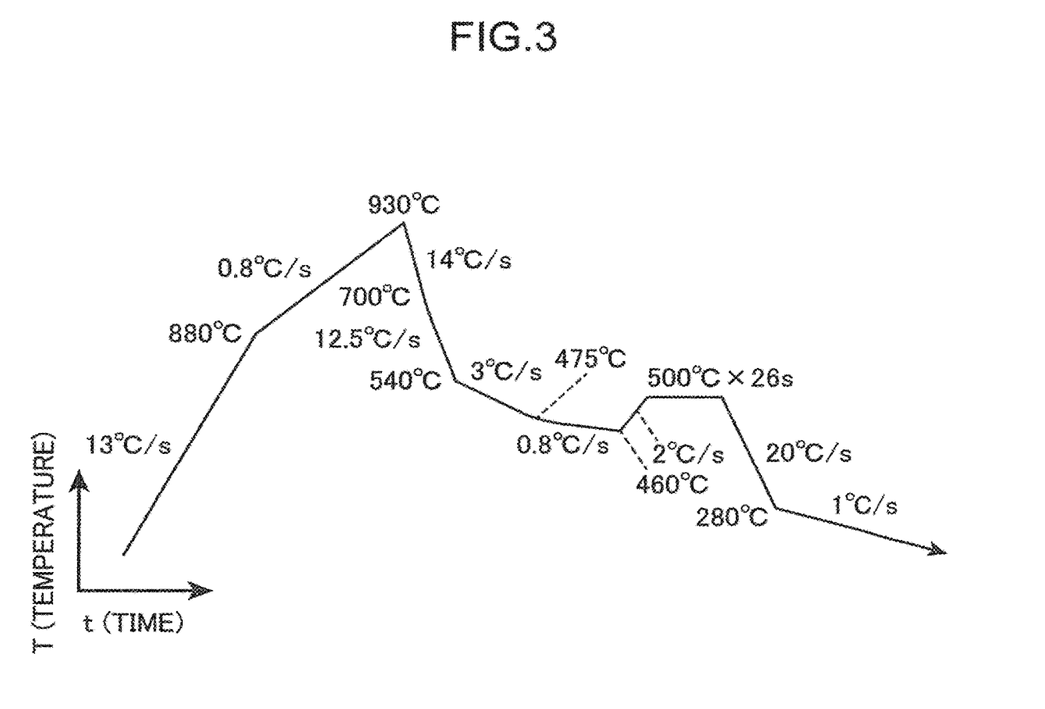
FIG. 3 is a schematic diagram illustrating a heat pattern in a heat treatment 1 in Example.
Figure 4:
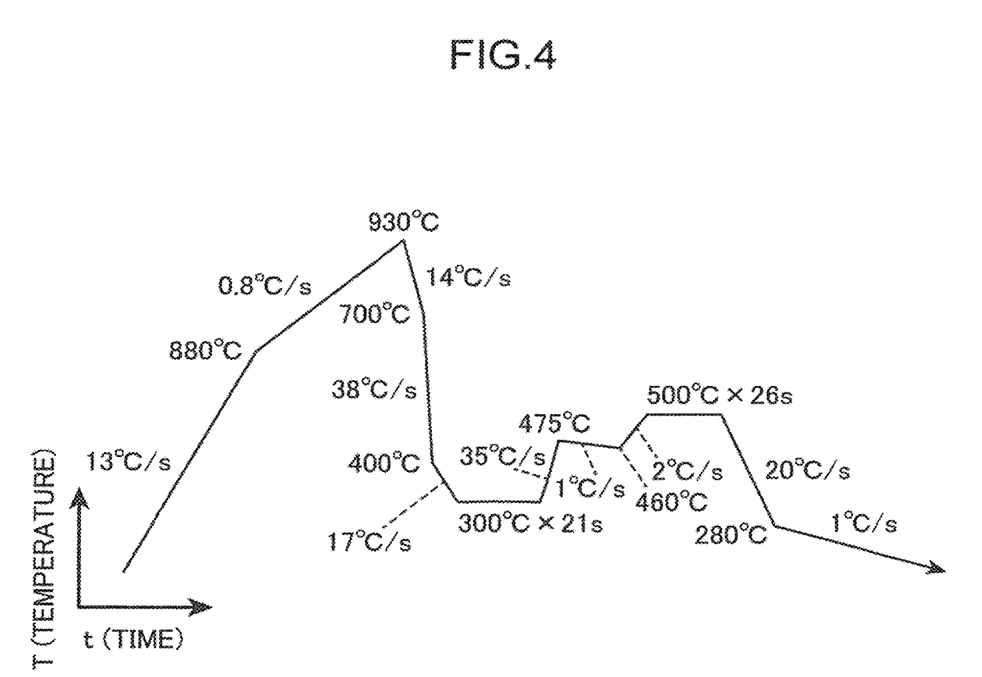
FIG. 4 is a schematic diagram illustrating a heat pattern in a heat treatment 2 in Example.
Figure 5:
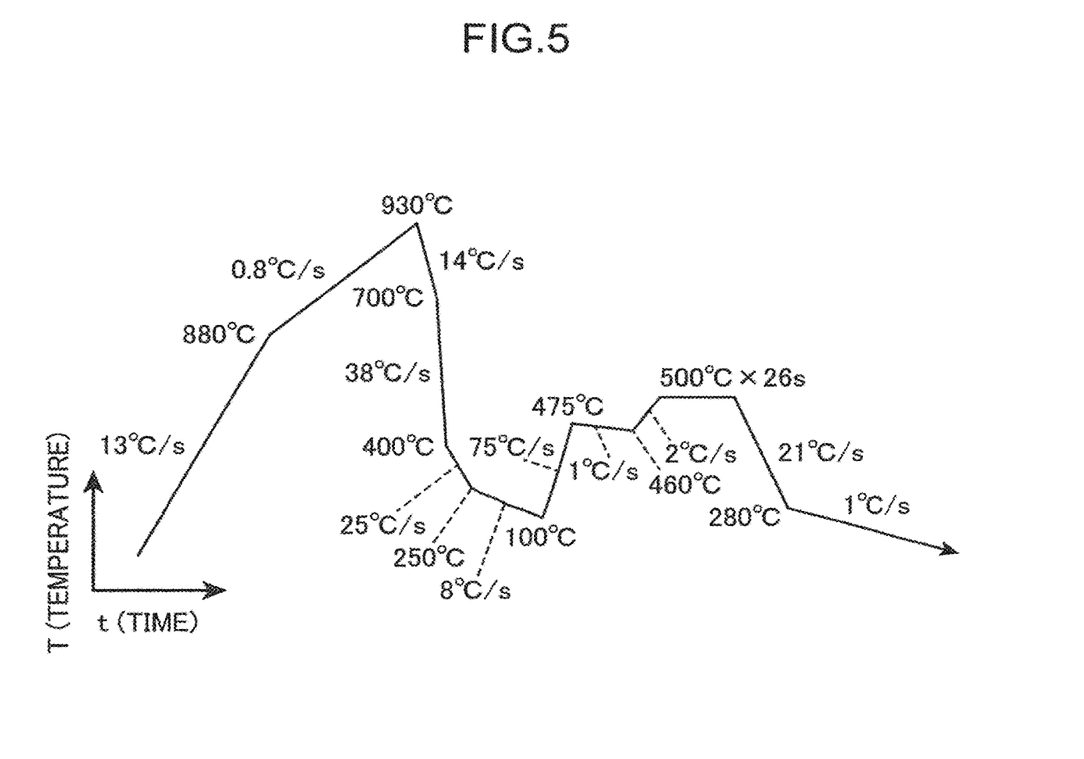
FIG. 5 is a schematic diagram illustrating a heat pattern in a heat treatment 3 in Example.

Thereafter, the obtained cold-rolled steel sheets were annealed by heat treatments (heat treatments 1 to 3) having heat patterns illustrated in FIGS. 3 to 5. Specifically, the heat treatments 1 to 3 were performed for steel types A and B. The heat treatment 1 was performed for the other steel type C.

Detailed data for the heat treatments illustrated in FIGS. 3 to 5 are presented in the following Tables 2 to 4. In other words, the heat pattern illustrated in FIG. 3 is based on the data presented in the following Table 2 (heat treatment 1), the heat pattern illustrated in FIG. 4 is based on the data presented in the following Table 3 (heat treatment 2), and the heat pattern illustrated in FIG. 5 is based on the data presented in the following Table 4 (heat treatment 3). "s" illustrated in FIGS. 3 to 5 means "second". The corresponding steps [(a) to (e)] in FIG. 1 are presented in Tables 2 to 4.

In the heat treatments 1 to 3 illustrated in FIGS. 3 to 5, the hot-dip galvanizing treatment and the alloying heat treatment are not performed in the second cooling step [step (c) illustrated in FIG. 1]. The "steps" presented in the following Tables 2 to 4 indicate the measured positions that sequentially indicate the numerical values (set temperature and cooling rate) corresponding to FIGS. 3 to 5, but some of the step positions presented in Tables 2 to 4 are omitted in FIGS. 3 to 5. In Tables 2 to 4, a negative cooling rate indicates a heating rate (rate of temperature rise).

In Tables 2 to 4, there are some places that do not clearly state the average cooling rate in the temperature ranges regulated in steps (a) to (c) above, but these values can be calculated based on the data in Tables 2 to 4. For example, in Table 2, the transit time ("Total time" presented in Table 2; the same applies below) at which the steel sheet temperature reaches 900° C. is calculated as "130 seconds" and the average cooling rate from 900° C. to 540° C. [average cooling rate in step (b)] is 12.9° C./sec [≈(900° C.-540° C.)/(158 sec-130 sec)].

In Table 2, the transit time at which the steel sheet temperature reaches 440° C. is calculated as "252 seconds" and the average cooling rate [average cooling rate in step (c)] from 540° C. to 440° C. is 1.06° C./sec [≈(540° C.-440° C.)/(252 sec-158 sec)]. Similarly, the average cooling rate from 440° C. to 280° C. [average cooling rate in step (d)] is calculated as 20.0° C./sec [=(440° C.-280° C.)/(260 sec-252 sec)].

TABLE 2

| Step | Set temperature (° C.) | Time (sec) | Total time (sec) | Cooling rate (° C./sec) | Corresponding step in FIG. 1 |
|---|---|---|---|---|---|
| 1 | 0 | — | — | — | — |
| 2 | 880 | 68 | 68 | −12.94 | — |
| 3 | 930 | 60 | 128 | −0.83 | (a) |

TABLE 2-continued

| Step | Set temperature (° C.) | Time (sec) | Total time (sec) | Cooling rate (° C./sec) | Corresponding step in FIG. 1 |
|---|---|---|---|---|---|
| 4 | 700 | 16 | 144 | 14.38 | (b) |
| 5 | 600 | 8 | 152 | 12.50 | (b) |
| 6 | 540 | 6 | 158 | 10.00 | (b) |
| 7 | 518 | 7 | 165 | 3.14 | (c) |
| 8 | 497 | 7 | 172 | 3.00 | (c) |
| 9 | 475 | 7 | 179 | 3.14 | (c) |
| 10 | 460 | 20 | 199 | 0.75 | (c) |
| 11 | 500 | 24 | 223 | −1.67 | (c) |
| 12 | 500 | 26 | 249 | 0.00 | (c) |
| 13 | 280 | 11 | 260 | 20.00 | (d) |
| 14 | 50 | 218 | 478 | 1.06 | (e) |

TABLE 3

| Step | Set temperature (° C.) | Time (sec) | Total time (sec) | Cooling rate (° C./sec) | Corresponding step in FIG. 1 |
|---|---|---|---|---|---|
| 1 | 0 | — | — | — | — |
| 2 | 880 | 68 | 68 | −12.94 | — |
| 3 | 930 | 60 | 128 | −0.83 | (a) |
| 4 | 700 | 16 | 144 | 14.38 | (b) |
| 5 | 400 | 8 | 152 | 37.50 | (b) |
| 6 | 300 | 6 | 158 | 16.67 | (c) |
| 7 | 300 | 7 | 165 | 0.00 | (c) |
| 8 | 300 | 7 | 172 | 0.00 | (c) |
| 9 | 300 | 7 | 179 | 0.00 | (c) |
| 10 | 475 | 5 | 184 | −35.00 | (c) |
| 11 | 460 | 15 | 199 | 1.00 | (c) |
| 12 | 500 | 24 | 223 | −1.67 | (c) |
| 13 | 500 | 26 | 249 | 0.00 | (c) |
| 14 | 280 | 11 | 260 | 20.00 | (d) |
| 15 | 50 | 218 | 478 | 1.06 | (e) |

TABLE 4

| Step | Set temperature (° C.) | Time (sec) | Total time (sec) | Cooling rate (° C./sec) | Corresponding step in FIG. 1 |
|---|---|---|---|---|---|
| 1 | 0 | — | — | — | — |
| 2 | 880 | 68 | 68 | −12.94 | — |
| 3 | 930 | 60 | 128 | −0.83 | (a) |
| 4 | 700 | 16 | 144 | 14.38 | (b) |
| 5 | 400 | 8 | 152 | 37.50 | (b) |

TABLE 4-continued

| Step | Set temperature (° C.) | Time (sec) | Total time (sec) | Cooling rate (° C./sec) | Corresponding step in FIG. 1 |
|---|---|---|---|---|---|
| 6 | 250 | 6 | 158 | 25.00 | (c) |
| 7 | 200 | 7 | 165 | 7.60 | (c), (d) |
| 8 | 150 | 7 | 172 | 7.60 | (d) |
| 9 | 100 | 7 | 179 | 7.60 | (d) |
| 10 | 475 | 5 | 184 | −75.00 | (d) |
| 11 | 460 | 15 | 199 | 1.00 | (d) |
| 12 | 500 | 24 | 223 | −1.67 | (d) |
| 13 | 500 | 26 | 249 | 0.00 | (d) |
| 14 | 280 | 11 | 260 | 21.00 | (d) |
| 15 | 50 | 218 | 478 | 1.06 | (e) |

The respective steel sheets thus obtained were subjected to the measurement of martensite volume fraction, bainite volume fraction, retained austenite volume fraction, the number of laths per 300 μm of total length, and tensile properties according to the following procedure.

[Fraction of Each Structure in Metal Structure]

In the present Example, the fractions of martensite, bainite, and retained austenite present in the ¼ portion thickness of the steel sheet were measured as follows. According to the manufacturing method of the present Example, it is extremely impossible that structures (for example, ferrite and pearlite) other than the above structures are present in the respective regions, and thus the structures other than the above structures were not measured. Hence, in the ¼ portion thickness of the steel sheet, calculation was performed so that the sum of martensite, bainite, and retained austenite was 100% by volume.

[Volume Fraction of Retained Austenite]

With regard to retained austenite, a 1.4 mm×20 mm×20 mm test piece was cut out from the steel sheet after being annealed and ground to the ¼ portion of the sheet thickness, and then chemically polished and the volume fraction of retained austenite (hereinafter, referred to as "retained y") was measured by the X-ray diffraction method (ISIJ Int. Vol. 33. (1993), No. 7, P. 776). A two-dimensional minute part X-ray diffractometer "RINT-PAPIDII" (trade name: manufactured by Rigaku Corporation) was used as the measuring apparatus, and the measured surface was in the vicinity of ¼ portion of the sheet thickness. Co was used as the target, and the number of measurements was one time for each test.

[Volume Fractions of Martensite and Bainite]

Bainite and martensite were measured by the point calculation method as follows. First, a 1.4 mm×20 mm×20 mm test piece was cut out from the steel sheet, the cross section thereof parallel to the rolling direction was polished, the test piece was subjected to nital etching, and then the structure at the ¼ portion of the sheet thickness was observed with a FE-SEM (Field Emission Scanning Electron Microscope) micrograph (magnification: 3000-fold). The observation was performed on a FE-SEM image using a grid with 0.3 μm intervals, and bainite and martensite were distinguished from each other based on the color and the like of the grains, and the volume fraction of each of these was measured. With regard to the measurement points, the structures at the points at which the grids intersect each other at a right angle were separated, and 100 points were examined to calculate the fraction. The measurement was performed in one visual field for each.

Figure 6:
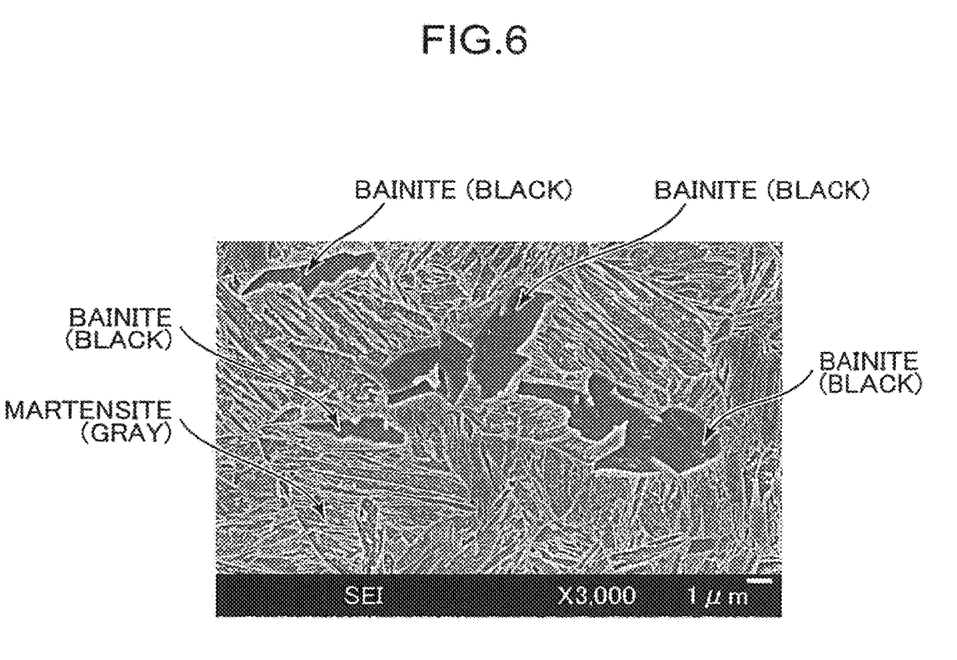
FIG. 6 is a drawing-substituting micrograph illustrating an example of the structure of a high-strength steel sheet of the present embodiment.

In detail, in the SEM micrograph after nital etching, the structure observed in black is bainite and the remaining part is martensite. FIG. 6 (drawing-substituting photograph) illustrates an example of a metal structure illustrating bainite and martensite.

As described above in detail, in the present Example, retained austenite and other structures (bainite and martensite) were measured by different methods and thus the sum of these structures was not always 100% by volume. Hence, when determining the volume fraction of each of bainite and martensite, adjustment was made so that the sum of all the structures was 100% by volume. Specifically, the fraction of each of bainite and martensite measured by the point calculation method was proportionally distributed to the numerical value attained by subtracting the fraction of retained austenite measured by the X-ray diffraction method from 100% by volume, and the volume fraction of each of bainite and martensite was finally determined.

[Number of Laths Per 300 μm in Total Length]

Figure 2A:
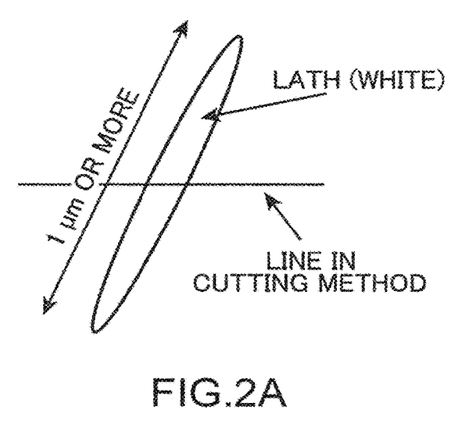
FIG. 2A and FIG. 2B are an explanatory diagrams when measuring the number of laths by a cutting method.
Figure 2B:
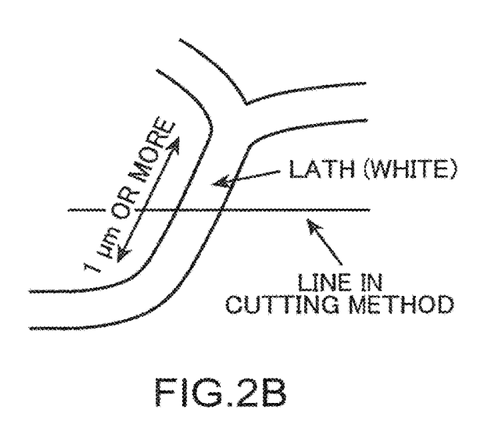

The number of laths measured in a total length of 300 μm was measured in a total length of 300 μm by a cutting method after photographing a cross section parallel to the rolling direction at the ¼ portion thickness of a steel sheet subjected to nital etching at 3,000-fold using FE-SEM. The cutting method is usually a method for measuring the particle size (JIS G 0551:2013), but was applied as a method for measuring the number of laths in the present Example. Specifically, a line having a total length of 300 μm was drawn on the FE-SEM image, and the number of laths over which the line passed (the number of intersecting points) was measured. The lath is a region that is a white portion having a size of 1 μm or more in a SEM image of a steel sheet subjected to nital etching photographed at a magnification of 3000-fold using FE-SEM. A state in which the number of laths is measured by the cutting method is schematically illustrated in FIG. 2A and FIG. 2B.

[Tensile Properties]

With regard to the tensile strength TS and 0.2% proof stress $\sigma_{0.2}$, a JIS 5 test piece (sheet-like test piece) was collected so that the longitudinal direction of the test piece was the direction perpendicular to the rolling direction on the surface parallel to the cold rolling surface, and was tested in conformity with JIS Z 2241: 2011.

The acceptance criteria were a tensile strength TS of 1470 MPa or more and a yield strength (0.2% proof stress $\sigma_{0.2}$) of 1000 MPa or more.

The results are presented in the following Table 5 together with the applied steel types (steel types A, B and C in Table 1) and the heat treatment conditions (heat treatments 1 to 3).

TABLE 5

| Test No. | Steel type | Heat treatment condition | Fraction of each structure in metal structure (% by volume) | | | Number of laths per 300 μm of total length (pieces) | Mechanical properties | | Remark |
|---|---|---|---|---|---|---|---|---|---|
| | | | Martensite | Bainite | Retained austenite | | 0.2% proof stress $\sigma_{0.2}$ (MPa) | Tensile strength TS (MPa) | |
| 1 | A | Heat treatment 1 | 91.0 | 3.8 | 5.2 | 211 | 990 | 1541 | Comparative Example |
| 2 | A | Heat treatment 2 | 90.2 | 0.0 | 9.8 | 244 | 934 | 1154 | Comparative Example |
| 3 | A | Heat treatment 3 | 97.7 | 0.0 | 2.3 | 202 | 1082 | 1176 | Comparative Example |

TABLE 5-continued

| Test No. | Steel type | Heat treatment condition | Fraction of each structure in metal structure (% by volume) | | | Number of laths per 300 μm of total length (pieces) | Mechanical properties | | Remark |
| | | | Martensite | Bainite | Retained austenite | | 0.2% proof stress $\sigma_{0.2}$ (MPa) | Tensile strength TS (MPa) | |
| --- | --- | --- | --- | --- | --- | --- | --- | --- | --- |
| 4 | B | Heat treatment 1 | 95.9 | 0.0 | 4.1 | 258 | 1058 | 1598 | Examples |
| 5 | B | Heat treatment 2 | 85.4 | 0.0 | 14.6 | 269 | 863 | 1282 | Comparative Example |
| 6 | B | Heat treatment 3 | 96.1 | 0.0 | 3.9 | 222 | 1118 | 1272 | Comparative Example |
| 7 | C | Heat treatment 1 | 95.5 | 0.0 | 4.5 | 289 | 1042 | 1586 | Examples |

From these results, it can be considered as follows. Test Nos. 4 and 7 are Examples manufactured using steel types (steel types B and C in Table 1) that satisfy the chemical composition regulated in the present invention under proper heat treatment conditions (heat treatment 1 illustrated in FIG. 3). In these examples, it can be seen that the fraction of each structure in the metal structure and the number of laths per 300 μm of total length are properly adjusted and the acceptance criteria are satisfied as the yield strength (0.2% proof stress $\sigma_2$) is 1000 MPa or more and the tensile strength TS is 1470 MPa or more.

On the other hand, Test Nos. 1 to 3, 5, and 6 are Comparative Examples that do not satisfy any of the requirements regulated in the present invention and do not satisfy any of the properties of the steel sheet.

Specifically, Test No. 1 is an example manufactured under proper heat treatment conditions (heat treatment 1 illustrated in FIG. 3) using a steel type (steel type A in Table 1) that does not satisfy the chemical composition regulated in the present invention. In this example, since a steel type not containing Cr is used, bainite is excessive, the number of laths per 300 μm of total length is small, and the yield strength has decreased.

Test No. 2 is an example manufactured using a steel type (steel A in Table 1) that does not satisfy the chemical composition regulated in the present invention under improper heat treatment conditions (heat treatment 2 illustrated in FIG. 4). This example is an example in which a steel type not containing Cr is used and the average cooling rate in the third cooling step [step (d) illustrated in FIG. 1] is not 5.0° C./sec or more (steps 6 to 13 in Table 3), and retained austenite has increased and the yield strength and tensile strength TS have decreased in this example.

Test No. 3 is an example manufactured using a steel type (steel A in Table 1) that does not satisfy the chemical composition regulated in the present invention under improper heat treatment conditions (heat treatment 3 illustrated in FIG. 5). This example is an example in which a steel type not containing Cr is used and the cooling stop temperature in the third cooling step [step (d) illustrated in FIG. 1] is set to 100° C. (step 9 in Table 4), and the tensile strength TS has decreased since the number of laths per 300 μm of total length has decreased in this example.

On the other hand, in Test Nos. 5 and 6, steel types (steel type B in Table 1) that satisfy the chemical composition regulated in the present invention is used, but the heat treatment conditions are out of the proper range (heat treatment 2 illustrated in FIG. 4 and heat treatment 3 illustrated in FIG. 5), and the desired properties are not attained.

Specifically, Test No. 5 is an example in which the average cooling rate in the third cooling step [step (d) illustrated in FIG. 1] is not 5.0° C./sec or more (steps 6 to 13 in Table 4), and retained austenite has increased and the yield strength and tensile strength TS have decreased in this example.

Test No. 6 is an example in which the cooling stop temperature in the third cooling step [step (d) illustrated in FIG. 1] is set to 100° C. (step 9 in Table 4), and the tensile strength TS has decreased since the number of laths per 300 μm of total length has decreased in this example.

This application is based on Japanese Patent Application No. 2018-58189 filed on Mar. 26, 2018 and Japanese Patent Application 2019-008594 filed on Jan. 22, 2019, the contents of which are included in the present application.

In order to express the present invention, the present invention has been described above appropriately and sufficiently through the embodiments with reference to specific examples, drawings and the like. However, it should be recognized by those skilled in the art that changes and/or improvements of the above-described embodiments can be readily made. Accordingly, changes or improvements made by those skilled in the art shall be construed as being included in the scope of the claims unless otherwise the changes or improvements are at the level which departs from the scope of the appended claims.

INDUSTRIAL APPLICABILITY

The present invention has a wide range of industrial applicability in the technical fields of steel sheets, galvanized steel sheets and manufacturing methods thereof, structural parts of motor vehicles, and the like.

The invention claimed is:
1. A high-strength steel sheet, comprising:
in % by mass,
C: 0.200% to 0.280%;
Si: 0.40% to 1.50%;
Mn: 2.00% to 3.00%;
P: more than 0% up to 0.015%;
S: more than 0% up to 0.0050%;
Al: 0.015% to 0.060%;
Cr: 0.20% to 0.80%;
Ti: 0.015% to 0.080%; and
B: 0.0010% to 0.0040%, wherein
a content of martensite is 93% by volume or more, contents of ferrite, pearlite, and bainite are 2% by volume or less in total, and a content of retained austenite is 7% by volume or less, based on an entire metal structure,
a number of laths in martensite measured by a cutting method in a total length of 300 μm in an image of the metal structure observed under a scanning electron microscope is 240 or more, and
a tensile strength of the high-strength steel sheet is 1470 MPa or more.

2. The high-strength steel sheet according to claim 1, further comprising, in % by mass, one or more selected from the group consisting of Cu: more than 0% up to 0.30%, Ni: more than 0% up to 0.30%, Mo: more than 0% up to 0.30%, V: more than 0% up to 0.30%, Nb: more than 0% up to 0.040%, and Ca: more than 0% up to 0.0050%.

3. A high-strength galvanized steel sheet comprising a hot-dip galvanized layer or a hot-dip galvannealed layer on a surface of the high-strength steel sheet according to claim 1.

4. The high-strength steel sheet according to claim 1, comprising in % by mass C: 0.210% to 0.240%.

5. The high-strength steel sheet according to claim 1, comprising in % by mass Si: 0.60% to 1.30%.

6. The high-strength steel sheet according to claim 1, comprising in % by mass Mn: 2.10% to 2.60%.

7. The high-strength steel sheet according to claim 1, comprising in % by mass P: more than 0% up to 0.010%.

8. The high-strength steel sheet according to claim 1, comprising in % by mass S: more than 0% up to 0.0030%.

9. The high-strength steel sheet according to claim 1, wherein a number of laths in martensite measured by a cutting method in a total length of 300 μm in an image of the metal structure observed under a scanning electron microscope is 250 or more.

10. The high-strength steel sheet according to claim 1, wherein a number of laths in martensite measured by a cutting method in a total length of 300 μm in an image of the metal structure observed under a scanning electron microscope is 240 to 600.

* * * * *